United States Patent [19]
Fuhrmann et al.

[11] 3,725,489
[45] Apr. 3, 1973

[54] HYDROGENATION OF ALKENES EMPLOYING AN ORGANOMETALLIC HYDROGENATION CATALYST

[75] Inventors: Robert Fuhrmann, Morris Plains; Jan F. Van Peppen, Chester, both of N.J.

[73] Assignee: Allied Chemical Corporation, New York, N.Y.

[22] Filed: Oct. 2, 1969

[21] Appl. No.: 863,359

[52] U.S. Cl. .........260/666 P, 268/397.2, 260/397.4, 260/409, 260/429, 260/441, 260/446, 260/464, 260/465.1, 260/468 R, 260/476 R, 260/485 R, 260/486 R, 260/488 R, 260/514 R
[51] Int. Cl. ..........C07c 5/02, C07c 5/16, C07c 9/00
[58] Field of Search..260/409, 690, 666, 676, 666 A, 260/666 P, 677 R, 677 H, 683.9

[56] References Cited

UNITED STATES PATENTS

| | | |
|---|---|---|
| 3,480,659 | 11/1969 | Dewhirst..........................260/690 X |
| 3,458,547 | 7/1969 | Coffey..............................260/690 X |
| 3,454,644 | 7/1969 | Dewhirst..........................260/690 X |

OTHER PUBLICATIONS

Horner et al. "Hydrogen Transfer Process XVII" Chem. Abst. Vol. 69 (1968) 9566 K

*Primary Examiner*—Lewis Gotts
*Assistant Examiner*—Catherine L. Mills
*Attorney*—Arthur J. Plantamura and Herbert G. Burkhard

[57] ABSTRACT

Complexes of rhodium, ruthenium, platinum, palladium, osmium, or iridium with polymers of the structure:

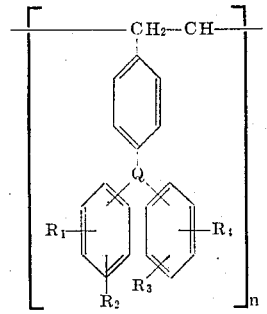

wherein Q is phosphorous, arsenic or antimony, and wherein $R_1$, $R_2$, $R_3$, and $R_4$ are independently hydrogen, $C_1$ to $C_4$ alkyl, $C_1$ to $C_4$ alkoxy or $C_1$ to $C_6$ dialkyl amino, and wherein $n$ is 10 to 500, are potent catalysts for the hydrogenation of ethylenic or acetylenic double bonds.

3 Claims, No Drawings

HYDROGENATION OF ALKENES EMPLOYING AN ORGANOMETALLIC HYDROGENATION CATALYST

BACKGROUND OF THE INVENTION

A very large number of industrial processes have as a crucial step the catalytic hydrogenation of an olefinic or acetylenic double bond. To cite just one example, in the preparation of cooking oils, the reduction of polyunsaturate content is generally achieved by catalytic hydrogenation of the double bonds present in the crude vegetable oils.

A wide variety of catalysts have been utilized to effect such catalytic hydrogenations, all of which have greater or lesser shortcomings. The most widely used catalysts are various transition metals either in the free state or in the form of their oxides. Such metals or oxides are frequently used in conjunction with a more or less inert support such as carbon black, kieselguhr, or calcium carbonate.

We have found an effective hydrogenation catalyst which is not only essentially totally insoluble in organic compounds, but which, because of its polymeric nature, has no tendency to be entrained by such compounds and, hence, is readily separable from such compounds by simple methods such as filtration or decantation. Additionally, unlike most conventional hydrogenation catalysts, our catalyst has high specificity. First, reduction of the ethylenic or acetylenic double bond using our catalyst will not result in the simultaneous reduction of other functional groups such as nitro or carbonyl that may also be present in the compound, the double or triple bond of which is being reduced.

Additionally, our catalysts have a very high degree of stereospecificity, that is, double bonds in the cis configuration tend to be reduced preferentially. This is particularly significant in the hydrogenation of edible oils.

SUMMARY OF THE INVENTION

It has now been found in accordance with our invention that complexes of rhodium, ruthenium, platinum, palladium, osmium, or iridium with polymers of the structure:

(I)
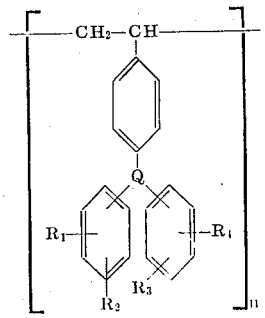

wherein Q is phosphorous, arsenic or antimony and wherein $R_1$, $R_2$, $R_3$, and $R_4$ are independently hydrogen, $C_1$ to $C_4$ alkyl, $C_1$ to $C_4$ alkoxy or $C_1$ to $C_6$ dialkyl amino, and wherein $n$ is 10 to 500, are potent catalysts for the hydrogenation of ethylenic or acetylenic double bonds.

These complexes are formed by mixing a solution of the polymer with a solution of a metal compound as will be more fully hereinafter defined. The metal-polymer complex forms virtually instantaneously on mixing the solutions, and since the complex is essentially totally insoluble in organic solvents, it precipitates virtually quantitatively. It may thereafter be recovered by conventional methods such as filtration, decantation, or centrifugation. Preferably, the preparation and storage of the metal-polymer complex is effected under substantially oxygen-free conditions.

Suitable solvents for the polymer and the metal compound are any of the aliphatic, alicyclic or aromatic liquid hydrocarbons such as $C_5$ to $C_{12}$ alkanes and cycloalkanes or benzene, toluene, xylene, cumene, and the like. Also suitable are aliphatic and cycloaliphatic ethers such as diethyl ether, tetrahydrofuran, glyme, diglyme, diethyl carbitol and dioxane.

The concentration of the polymer in solution is not critical, usually about 0.5 to 10 weight percent solutions are most conveniently handled. The metal compounds are very sparingly soluble in the solvent and an essentially saturated solution thereof which is usually about 1.0 weight percent, is generally utilized, although again the exact concentration is not critical. The temperature of the two solutions on mixing is not significant and therefore room temperature is generally utilized for the sake of convenience.

The amount of polymer solution and metal compound solution which are mixed together should be such that the atomic ratio of metal to element "Q" of the polymer in the mixture, and, hence, in the complex, ranges from about 1:1 to 1:8, preferably about 1:2 to 1:5.

The metal compounds that are reacted with the polymer can be represented by the empirical formula: $MX_sO_m$, wherein M connotes rhodium, ruthenium, platinum, palladium, osmium, or iridium; X is an anion such as chlorine, bromine, iodine, nitrate, acetate, or thiocyanate, preferably chlorine; $s$ equals the oxidation state of the metal and can be 1, 2 or 3; $m$ equals the average number of coordinately bonded olefin molecules and is 1 to 2; O connotes either a $C_2$ to $C_{10}$ linear or cyclic mono- or diolefin (diene) or an arsenic or antimony containing moiety of the structure: $AsR_3$ or $SbR_3$, wherein R is an aliphatic, alicyclic or aromatic radical of up to 10 carbons, or C=O. Generally, the nature of anion X is not critical. The halides, nitrates, acetates, or thiocyanates are, however, the most readily available of the salts of the metals used in the instant invention.

The preparation of such metal compounds is described in a variety of technical journal articles such as Abel, et al., J.Chem.Soc., 3,178 (1959); Cramer, Inorg.Chem., 1, 722 (1962); Winkhaus, et al., Chem.Ber., 99, 3,602, 3,610 (1966); Porri, J. Organometal Chem., 6, 422 (1966); Porri, et al., Chem. Commun., 336 (1965). The preparative reaction involves simply mixing the olefin or diene or $AsR_3$ compound (usually in molar excess) with a simple of alkali metal halide salt of rhodium, ruthenium, platinum, palladium, osmium, or iridium, usually in water or aqueous or anhydrous alcohol or in an aprotic solvent. Using dicyclopentadiene and potassium palladium chloride as an example, the reaction can be represented as follows:

1) 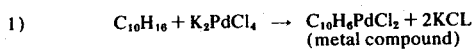

Other examples are as follows:

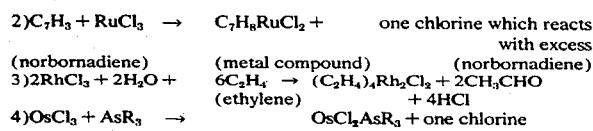

It should be noted that, in the first example, the metal in the olefin-metal compound is in the same oxidation state as in the metal halide prior to reaction with the olefin, while in the other examples, a change occurs in the oxidation state of the metal on reaction with the olefin. Such change occurs with an accompanying oxidation of excess olefin as shown in equation (3). The art has not elucidated any systematic explanation of why such change in oxidation state occurs in certain instances and not in others, although such occurrence is certainly related to the particular metal halide and olefin or arsine being reacted. Likewise, it should be noted that, although all the metal compounds useful in the instant invention have the empirical formula $MX_sO_m$, such metal compound can be monomeric, dimeric or polymeric with a halogen bridge. Where the metal compound is polymeric, $m$ is usually not a whole number because the olefin "O" can be coordinately bonded to two metal atoms. However, the actual number of olefin molecules to which a given metal atom is bonded is always a whole number, i.e., 1 or 2.

Exemplary of suitable metal compounds are the following: Rhodium: $[RhCl(olefin)_2]_2$, wherein said olefin is ethylene, propylene, cyclooctene, cycloheptene or norbornene; $Rh(diene)_2Cl$ and $[Rh(diene)Cl]$, wherein said diene is cyclooctadiene-1,4; cyclohexadiene-1,3; hexadiene-1,5; 2,5-dimethylhexadiene-1,5; butadiene-1,3; isoprene or 1,2-dimethylbutadiene-1,3; $]Rh(cyclooctatetraene)Cl]_2$; $Rh(cyclooctene)(diene)X$, wherein X is Cl or Br and wherein the diene is as defined above; $Rh(methylsorbate)_2Cl$; $Rh(AsR_3)_{33})_3X$, wherein R is phenyl, cyclohexyl or p-tolyl and wherein X is as defined above.

Platinum: $Pt(diene)X_2$, wherein X is chlorine or bromine and wherein said diene is norbornadiene, cyclooctadiene-1,5, dicyclopentadiene, dipentene or hexadiene-1,5; $[Pt(olefin)X]_2$, wherein X is as defined above and wherein said olefin is ethylene, propylene or cyclooctene; $[Pt(alkoxyolefin)Z]_2$, wherein said alkoxyolefin is methoxydicyclopentadiene, 8-methoxycyclooctene or 4-methoxydipentene and wherein Z is Cl, Br, I, $NO_3$ or SCN.

Tridium: $[Ir(diene)X]$, wherein X is as defined above and wherein said diene is cyclooctadiene-1,5, norbornadiene, cyclohexadiene-1,3 or 2,3-dimethylbutadiene; $Ir(olefin)_3COX$ or $[Ir(olefin)_2COX]_2$, wherein X is as defined above and wherein said olefin is cycloheptene or cyclooctene.

Palladium: $Pd(diene)X_2$, wherein X is as defined above and wherein said diene is norbornadiene, cyclooctadiene-1,5 or dicyclopentadiene; $[Pd(alkoxyolefin)X_2]$, wherein X is as defined above and wherein said alkoxyolefin is methoxy, ethoxy or propoxy cyclooctene or dicyclopentadiene.

Ruthenium: $Ru_2(norbornadiene)_2X_2$ and

Osmium: $HOsXCO[As(C_6H_5)_3]_3$, wherein X is as defined above.

The exact structure of the complex catalyst of the instant invention formed by reaction of such metal compounds with polymers of structure (I) is not precisely known. However, it is believed that the metal atom forms coordination bonds with the element "Q" of the polymer and in forming such bonds moieties "O" of the metal compound are displaced. Such moieties are soluble in the organic solvent and remain dissolved therein when the metal-polymer complex precipitates. That is, the olefin, C=O, arsine or antimony ligands, which are coordinately bonded to the metal atom, are sufficiently labile to be displaced by atom "Q" of the polymer. The structure of the complexed portions of the polymer molecule can, therefore, best be represented schematically as follows:

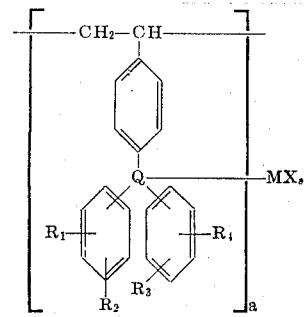

wherein $s$ is as previously defined and wherein $a$ is the number of atoms "Q" bonded to a given metal, M, $a$ being a whole number 1 to 4. It should be noted that the atoms "Q" bonded to a given metal atom M can be part of the same polymer chain or different polymer chain. As is apparent, not every unit, i.e., every element "Q"

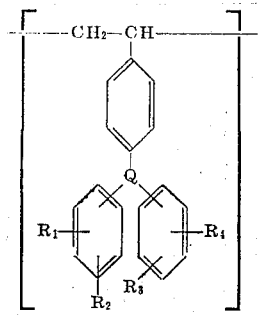

of a polymer chain is ordinarily coordinated with a metal ion. The percentage of such coordinated units is dependent upon the atomic ratio of metal to element "Q" in the polymer-metal compound mixture, which, as heretofore indicated, can range from 1:1 to 1:8 and, of course, upon the value of $a$.

As heretofore indicated, the polymers utilized in the instant invention comprise recurring units of the structure:

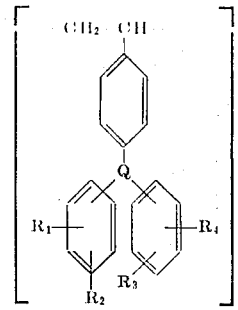

Such polymers are prepared by the free radical-induced polymerization of vinylic monomers of the structure:

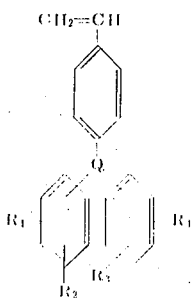

The polymerization is effected simply by heating the monomer at 30° to 200° C for from 2–20 hours in the presence of an olefin-free radical polymerization initiator such as azobisisobutyronitrile, phenyl-azo-triphenylmethane, azo-bis-cyclopentyl nitrile, triazobenzene, tert-butyl peroxide, tert-amyl peroxide, acetyl peroxide, succinoyl peroxide, benzoyl peroxide, or lauroyl peroxide. Alternatively, ultraviolet or thermal initiation can be used to effect polymerization.

The monomers can be synthesized by the following general reaction:

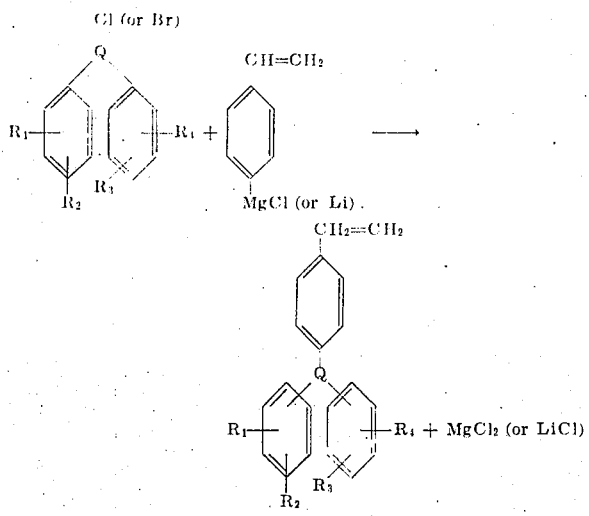

This reaction is known in the art. See, for example, J.Org. Chem., 26, 4,157 (1961); J.Pol.Sci., A 2, 1241 (1964); and U.S. Pat. No. 3,152,104.

Catalytic hydrogenations utilizing the polymer-metal complex catalyst of the instant invention can be carried out at virtually any hydrogen pressure in the range of atmospheric up to 10,000 lb. or more. The duration of the hydrogenation will vary with the temperature, mol ratio of catalyst to compound, and most importantly, the relative reductivity of the particular compound. For reasons of economy and equipment simplicity, the lowest pressure and minimum time within which the desired degree of reduction of the carbon-carbon double or triple bonds of the compound being reduced is achieved will ordinarily be utilized. The temperature of the hydrogenation can be as low as about 20° C. The upper limit is determined only by the decomposition temperature of the catalyst or compound being reduced which is at least 200° C for the former.

The mol ratio of catalyst to compound can vary from about 0.05 to 10 weight percent, preferably 0.5 to 2.0 weight percent. Catalyst ratios above 10 weight percent are, of course, perfectly operable but impose an economic penalty without any concomitant advantage.

If desired, the compound can be hydrogenated either neat or preferably when the compound is a solid, dissolved in an inert solvent such as a $C_5$ to $C_{10}$ alkane, aromatic, or alkyl aromatic hydrocarbon, $C_1$ to $C_4$ alkanol or a $C_4$ to $C_8$ dialkyl ether or diether such as pentane, heptane, cyclohexane, toluene, xylene, cumene, methanol, ethanol, isopropanol, diethyl ether, glyme, diglyme, or diethyl carbitol or a mixture thereof.

The compounds which can suitably be hydrogenated using the catalysts of the instant invention include virtually any $C_2$ to $C_{40}$ organic compound having at least one nonaromatic carbon-carbon double or triple bond such as alkenes, cycloalkenes, alkenylaromatics or the alkynl analogs thereof. In all cases, only the nonaromatic carbon-carbon double or triple bond will be reduced. Any other functional groups such as aromatic double bonds, carbon-oxygen double bonds (carbonyl groups), carbon-nitrogen triple bonds (nitrile groups), and nitro groups that may be present in the compound will not be reduced. Examples of compounds, the nonaromatic double or triple bonds of which can be reduced using the catalysts of the instant invention, include: $C_2$ to $C_{40}$ unsubstituted olefins such as ethylene, propene, butene, hexene, dodecene, eicosene, tricosene, and their acetylenic or alkylated counterparts; alkenyl aromatics such as styrene, $\alpha$-methyl styrene; acids and the alkyl esters thereof such as muconic acid, cinnamic acid, oleic acid, the dimer of linoleic acid, acrylic acid, methacrylic acid, crotonic acid(trans), isocrotonic acid(cis), 2-cyclohexane-1-carboxylic acid, linoleic acid, propargylic acid, ethyl propiolic acid and ethynyl propiolic acid; alcohols such as geraniol, oleyl, cholesterol, testosterone, allyl, allyl methyl carbinol, ethyl vinyl carbinol, and 2-cyclohexen-1-ol; aldehydes and ketones such s acrolein, croton aldehyde, cinnamaldehyde, citronellal, civetone, mesityl oxide, cyclohexenone, and alkyl cyclohexenone; amides such as acrylamide; other compounds such as allyl chloride, 1-chlorobutene-2, 1-chlorocyclohexene-2, acrylonitrile, 1-cyanobutene-2, 1-cyanocyclohexene-2, 1-nitrobutene-2, 1-nitrocyclohexene-2, and m-nitrostyrene. Additionally, animal and vegetable oils and fats which, in general, consist of esters of saturated and unsaturated carboxylic acids may be hydrogenated using the catalysts of the instant invention to reduce or eliminate entirely such unsaturation. It should be noted that these fats and oils have substantially more than 40 carbon atoms in most instances, although the unsaturated acid chain itself generally contains less than 20 carbon atoms. Exemplary of oils or fats which may be hydrogenated according to the process of the instant invention include almond oil, apricot-kernel oil, castor oil, coconut (copra) oil, corn oil, cottonseed oil, safflower oil, sesame oil, soybean oil, tallow (beef), teaseed oil, tung (China wood) oil, wheat-germ oil, lard (prime steam, U.S.), linseed oil, mustardseed oil, olive oil, palm-kernel oil, peanut oil, poppyseed oil, and rapeseed (colza) oil.

The invention can be more fully understood by reference to the following examples. All parts are parts by weight unless otherwise expressly noted.

EXAMPLE 1

Part A

Diphenyl-p-styrylphosphine monomer was prepared according to the method of Robinowitz, et al., J. Org. Chem., 26, 4,157 (1961). One-hundred parts of this monomer dissolved in 500 parts of benzene were placed in a glass pressure vessel; 7.5 parts of azobisisobutyronitrile was added, the vessel degassed and heated under a nitrogen atmosphere at 64° C for 6 hours. The vessel contents were then cooled to room temperature and the polymer precipitated by addition of 750 parts of hexane. The polymer, after reprecipitation from benzene with methanol, had an inherent viscosity of 0.09, molecular weight = 10,400.

Part B

Dichlorotetraethylenedirhodium ]RhCl($C_2H_4$)$_2$ dimer] was prepared as follows according to the method of Cramer [Inorg.Chem., 1, 722 (1962)]. Ten parts of rhodium trichloride trihydrate was dissolved in 200 parts of 95 percent ethanol. Ethylene was bubbled through this solution at room temperature for 16 hours. The product that precipitated was then collected by suction filtration affording 6.3 parts of dichlorotetraethylenedirhodium. Elemental analysis confirmed the structure.

EXAMPLE 2

Two parts polystyryl diphenyl phosphine polymer, as prepared in Example 1, was dissolved in 100 parts of distilled, degassed benzene. To this solution was added 0.5 part of [RhCl($CH_2$=$CH_2$)]$_2$ dissolved in 250 parts of distilled, degassed benzene. On addition of the metal compound to the polymer, precipitation instantaneously commenced. The reaction mixture was shaken over night while under vacuum. The brown precipitate was filtered, washed with benzene and dried affording a quantitative yield of the polymer-metal complex. On evaporation of the filtrate, only a negligible amount of residue was found.

EXAMPLE 3

Twelve parts rhodium polystyryl diphenyl phosphine complex, prepared as described in Example 2, was suspended in a mixture of 10,000 parts absolute ethanol and 5,000 parts benzene and the mixture was placed in a pressure vessel. The mixture was flushed with hydrogen and activated by shaking under hydrogen for 1 hour. Two hundred parts of heptene-1 was then added and the vessel shaken at atmospheric hydrogen pressure. The progress of the reaction was followed by vapor phase chromatography using a 10 percent ethylene glycol succinate on Chromosorb P column.

The same experiment was repeated without the 1-hour catalyst activation period. The results for both experiments are described in Table I.

TABLE I

Composition(%)

| Time (min.) | Heptane | Heptene-1 | Heptene-2 | Catalyst Activation |
|---|---|---|---|---|
| 15 | 37.3 | 43.5 | 19.2 | Yes |
| 15 | 17.8 | 82.2 | trace | No |
| 47 | 98.0 | all heptenes | =2 | Yes |
| 55 | 47.6 | 3.2 | 14.2 | No |

The heptene-2 is believed to be formed by isomerization.

EXAMPLE 4

This experiment describes a second hydrogenation of heptene-1 using catalyst prepared according to Example 2. No hydrogen pretreatment was used and hydrogen pressure was atmospheric. All other conditions were identical to those of Example 3. Results were as follows:

TABLE II

| Time (min.) | Heptane (%) | Heptene-1 (%) | Heptene-2 (%) |
|---|---|---|---|
| 30 | 18.2 | 76.6 | 5.1 |
| 60 | 34.6 | 51.4 | 14.0 |

EXAMPLE 5

Twelve parts of catalyst, prepared as described in Example 2, was added to 15,000 parts toluene and 200 parts of acetone and the mixture then placed in a pressure vessel. The vessel was flushed with hydrogen and shaken for 73 minutes under atmospheric hydrogen pressure. No isopropanol could be detected by vapor phase chromatography. At this point, 12 parts rhodium on carbon was added to the reaction mixture, the vessel flushed again with hydrogen, and the reaction continued. Seventy minutes after the addition of the rhodium-carbon catalyst, 6.6 percent isopropanol was detected, as well as similar amounts of methyl cyclohexane. At the end of 165 minutes (after addition of the rhodium-carbon catalyst), 12.8 percent isopropyl alcohol was detected and approximately double this amount of methyl cyclohexane.

EXAMPLE 6

Twelve parts rhodium on carbon was charged simultaneously with 12 parts of polystyryl diphenyl phosphine that had not been reacted with metal compound to 15,000 parts of toluene and 500 parts acetone. After 120 minutes of shaking at atmospheric hydrogen pressure, a 21.6 percent conversion of the acetone to isopropanol was observed but no methyl cyclohexane was present. In a parallel experiment, 12 parts of polymeric catalyst with no rhodium on carbon was reacted for 120 minutes. No isopropyl alcohol or methyl cyclohexane was found.

The results of Example 5 and Example 6 indicate that our catalyst, unlike conventional hydrogenation catalysts utilizing the same metal on an inert support, does not cause reduction of either carbonyl groups or the double bonds of an aromatic ring. Also, it is clear that the polymer does not poison the heterogeneously supported metal catalyst with respect to the reduction of carbonyl groups but does with respect to the reduction of aromatic double bonds. Finally, it is clear that the catalytic activity of our polymer-metal complex cannot be due to any free metal.

EXAMPLE 7

The following hydrogenation catalysts were prepared according to the procedure of Example 2 and found to be effective at reducing cyclohexene. Hydrogen pressure was maintained at 50 psig and the temperature at 35° C. In the table, Q and $R_1$ through $R_4$ denote the structure of the polymer in accordance with the structural formula I, while the first column indicates the metal compound reacted with such polymer to produce the catalyst. The ratio of Q to M in all cases was 4:1. Reaction was continued until no further drop in hydrogen pressure was noted. Gas chromatographic analysis of the product indicated the presence of less than 5 percent C=C in all cases.

TABLE III

| Metal Compound | Q | $R_1$ | $R_2$ | $R_3$ | $R_4$ |
|---|---|---|---|---|---|
| [RhCl(CH$_2$=CH$_2$)$_2$]$_2$ | P | H | H | CH$_3$ | H |
| RhCl$_2$(cyclooctadiene)$_2$ | P | CH$_3$ | H | CH$_3$ | H |
| [Rh(cyclooctene)$_2$Cl]$_2$ | P | CH$_3$ | CH$_3$ | CH$_3$ | CH$_3$ |
| Rh[As(c-hd 6H$_5$)$_3$]$_3$Br | As | C$_2$H$_5$ | H | C$_2$H$_5$ | H |
| Pt(norbornadiene)Cl$_2$ | P | C$_3$H$_7$ | H | C$_3$H$_7$ | H |
| [Pt(methoxydicyclopenta-DIENE)SCN]$^2$ | Sb | CH$_3$ | H | CH$_3$ | H |
| Pt(ethylene)$_2$Br$_2$ | Sb | H | H | H | H |
| [Ir(norbornadiene)Cl]$_2$ | As | CH$_3$ | H | CH$_3$ | H |
| Ir(ethylene)$_3$COCl | P | H | H | H | H |
| Ru$_2$(norbornadiene)Cl$_2$ | P | C$_2$H$_5$ | H | C$_2$H$_5$ | H |
| Pd(norbornadiene)Cl$_2$ | P | H | H | H | H |
| [Pd(methoxydicyclopenta-DIENE)Br]$_2$ | P | H | H | H | H |
| Ru$_2$(norbornadiene)Cl$_2$ | P | H | H | H | H |
| *HOsXCO[As(c$_6$H$_5$)$_3$]$^3$ | As | H | H | H | H |
| [RhCl(CH$_2$=CH$_2$)$_2$]$_2$ | P | (CH$_3$)$_2$N | H | (CH$_3$)$_2$NH | |
| [RhCl(CH$_2$=CH$_2$)$_2$]$_2$ | P | CH$_3$O | H | CH$_3$O | H |

*Note. In this case, hydrogen is in the form of an anion and has the meaning of X in the hitherto-given generic formula.

We claim:

1. A process for the catalytic hydrogenation of a C$_2$ to C$_{40}$ alkene or cycloalkene compound bond, comprising contacting said compound with from about 0.05 to 10 weight percent of a complex formed by admixing solutions of polymers comprising recurring units of the structure:

$$\left[ -CH_2-CH- \atop \begin{array}{c} | \\ \text{Ph} \\ | \\ Q \\ | \\ \text{Ar}(R_1,R_2,R_3,R_4) \end{array} \right]_n \quad (I)$$

wherein Q is phosphorous, arsenic or antimony, and wherein $R_1$, $R_2$, $R_3$, and $R_4$ are independently hydrogen, $C_1$ to $C_4$ alkyl, $C_1$ to $C_4$ alkoxy or $C_1$ to $C_6$ dialkyl amino, wherein $n$ is 10 to 500, and metal compounds of the formula $MX_sO_m$, wherein M connotes rhodium, ruthonium, platinum, palladium, osmium, or iridium; X is an anion such as chlorine, bromine, iodine, nitrate, acetate, or thiocyanate, preferably chlorine; $s$ equals the oxidation state of the metal and can be 1, 2 or 3; $m$ equals the average number of coordinately bonded olefin molecules and is 1 to 2; O connotes either a $C_2$ to $C_{10}$ linear or cyclic mono- or diolefin (diene) or an arsenic or antimony containing moiety of the structure: AsR$_3$ or SbR$_3$, wherein R is an aliphatic, alicyclic or aromatic radical of up to 10 carbons, or C=O, wherein the atomic ratio of metal to element Q ranges from about 1:1 to 1:8, in the presence of gaseous hydrogen at a temperature of at least about 20° C for a time sufficient to effect reduction of at least a portion of said carbon-carbon double bonds.

2. A process in accordance with claim 1 wherein said contacting is with from about 0.5 to 2.0 weight percent of said complex.

3. A process in accordance with claim 1 wherein said complex is activated by contacting with hydrogen prior to contacting said catalyst with said compound.

* * * * *